(12) United States Patent
Okano et al.

(10) Patent No.: US 11,365,848 B2
(45) Date of Patent: *Jun. 21, 2022

(54) COMPOSITE PRESSURE VESSEL LINER, COMPOSITE PRESSURE VESSEL, AND METHOD FOR PRODUCING COMPOSITE PRESSURE VESSEL LINER

(71) Applicant: JFE STEEL CORPORATION, Chiyoda-ku Tokyo (JP)

(72) Inventors: Hiroshi Okano, Tokyo (JP); Shusaku Takagi, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 411 days.

This patent is subject to a terminal disclaimer.

(21) Appl. No.: 16/323,024

(22) PCT Filed: Aug. 1, 2017

(86) PCT No.: PCT/JP2017/027936
§ 371 (c)(1),
(2) Date: Feb. 4, 2019

(87) PCT Pub. No.: WO2018/030223
PCT Pub. Date: Feb. 15, 2018

(65) Prior Publication Data
US 2019/0162364 A1 May 30, 2019

(30) Foreign Application Priority Data
Aug. 12, 2016 (JP) .............................. JP2016-158852

(51) Int. Cl.
| | | |
|---|---|---|
| *C21D 9/08* | (2006.01) | |
| *F17C 1/02* | (2006.01) | |
| *C22C 38/06* | (2006.01) | |
| *C22C 38/58* | (2006.01) | |
| *C22C 38/00* | (2006.01) | |
| *F16J 12/00* | (2006.01) | |
| *C21D 8/10* | (2006.01) | |
| *C22C 38/02* | (2006.01) | |
| *C22C 38/04* | (2006.01) | |
| *C22C 38/22* | (2006.01) | |

(52) U.S. Cl.
CPC ............... *F17C 1/02* (2013.01); *C21D 8/10* (2013.01); *C21D 9/08* (2013.01); *C22C 38/00* (2013.01); *C22C 38/02* (2013.01); *C22C 38/04* (2013.01); *C22C 38/06* (2013.01); *C22C 38/22* (2013.01); *C22C 38/58* (2013.01); *F16J 12/00* (2013.01); *C21D 2211/002* (2013.01); *C21D 2211/008* (2013.01); *F17C 2203/011* (2013.01); *F17C 2203/0604* (2013.01); *F17C 2203/0607* (2013.01); *F17C 2203/0639* (2013.01); *Y02E 60/32* (2013.01)

(58) Field of Classification Search
CPC ....................................................... C22C 38/04
See application file for complete search history.

(56) References Cited

U.S. PATENT DOCUMENTS

| | | | |
|---|---|---|---|
| 8,313,589 B2 | 11/2012 | Takasawa et al. | |
| 8,663,400 B2 | 3/2014 | Omura et al. | |
| 9,598,746 B2 | 3/2017 | Anelli et al. | |
| 10,106,875 B2 | 10/2018 | Takagi et al. | |
| 10,697,036 B2* | 6/2020 | Takagi ...................... | F17C 1/00 |
| 2012/0204994 A1 | 8/2012 | Anelli et al. | |
| 2016/0053355 A1 | 2/2016 | Takagi et al. | |
| 2016/0091140 A1 | 3/2016 | Takagi et al. | |

FOREIGN PATENT DOCUMENTS

| | | |
|---|---|---|
| EP | 2505682 A1 | 10/2012 |
| EP | 2789701 A1 | 10/2014 |
| EP | 2980246 A1 | 2/2016 |
| JP | 2009024225 A | 2/2009 |
| JP | 2009046737 A | 3/2009 |
| JP | 2009074122 A | 4/2009 |
| JP | 2009293799 A | 12/2009 |
| JP | 2010037655 A | 2/2010 |
| JP | 2011195883 A | 10/2011 |
| JP | 2014198878 A | 10/2014 |
| JP | 2014227573 A | 12/2014 |
| JP | 2016172909 A | 9/2016 |
| WO | 2014156187 A1 | 10/2014 |
| WO | 2014174845 A1 | 10/2014 |

OTHER PUBLICATIONS

English machine translation of JP 2014-198878 A of Nagao (Year: 2014).*
Oct. 31, 2017, International Search Report issued in the International Patent Application No. PCT/JP2017/027936.
Jul. 11, 2019, the Extended European Search Report issued by the European Patent Office in the corresponding European Patent Application No. 17839296.5.

* cited by examiner

*Primary Examiner* — Jophy S. Koshy

(74) *Attorney, Agent, or Firm* — Kenja IP Law PC

(57) ABSTRACT

A composite pressure vessel liner suitable for use in a composite pressure vessel for storing high-pressure hydrogen is provided. The composite pressure vessel liner is made of a steel material including: a predetermined chemical composition; and a metallic microstructure in which an area fraction of martensite at a position of ¼ of a wall thickness on an inner side is 30% or more, a total area fraction of martensite and bainite at the position of ¼ of the wall thickness on the inner side is 95% or more, and a total area fraction of martensite and bainite in a wall thickness center part is 95% or more, wherein the composite pressure vessel liner has a wall thickness of 20 mm or more in a longitudinal center part, and a tensile strength of 850 MPa or more in the wall thickness center part.

9 Claims, 1 Drawing Sheet

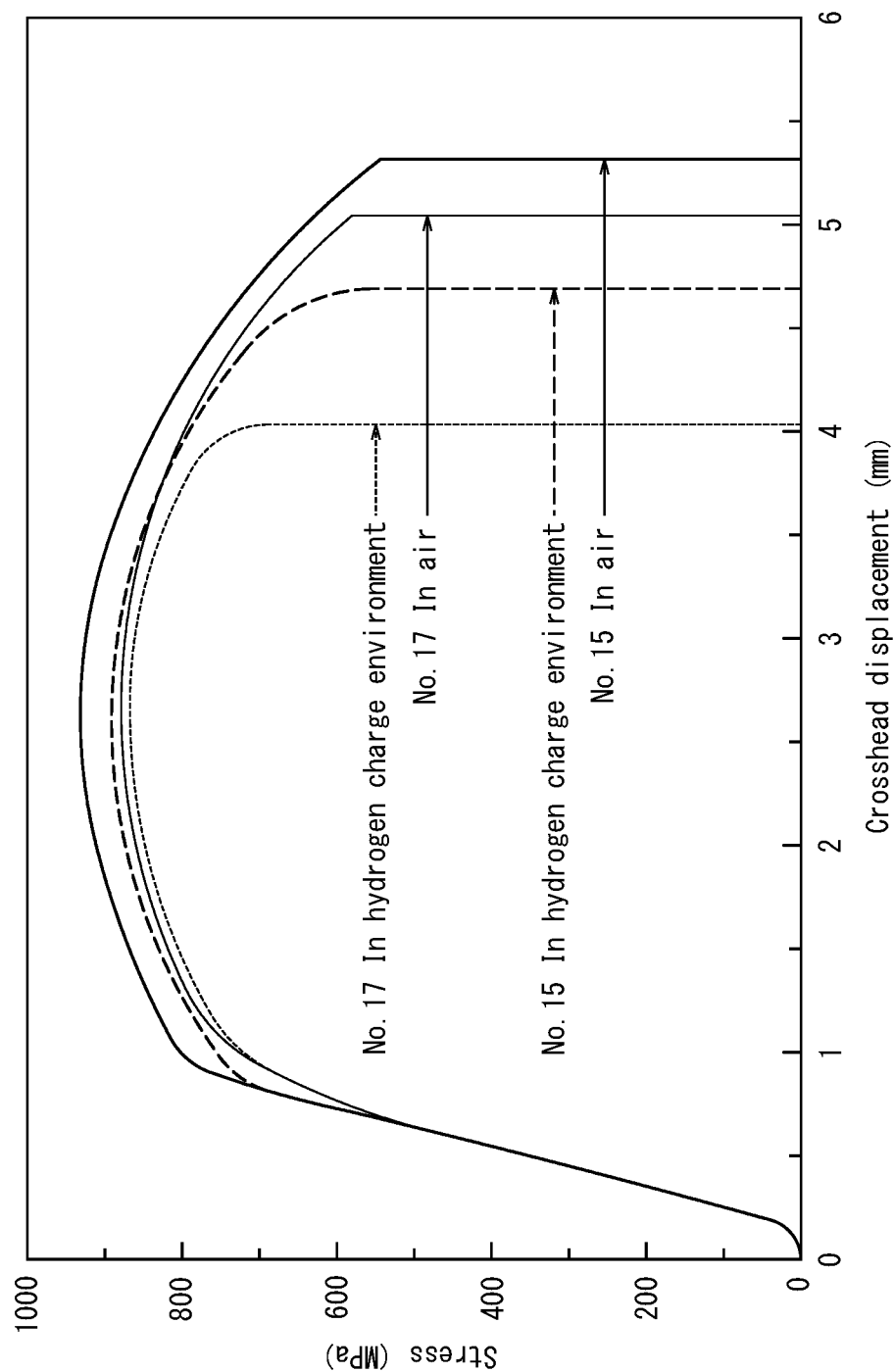

COMPOSITE PRESSURE VESSEL LINER, COMPOSITE PRESSURE VESSEL, AND METHOD FOR PRODUCING COMPOSITE PRESSURE VESSEL LINER

TECHNICAL FIELD

The present disclosure relates to a composite pressure vessel liner, and especially relates to a composite pressure vessel liner suitable for use in a composite pressure vessel for storing high-pressure hydrogen. The present disclosure also relates to a composite pressure vessel formed by coating the composite pressure vessel liner with a carbon fiber reinforced plastic, and a method for producing the composite pressure vessel liner.

BACKGROUND

Fuel cell vehicles using hydrogen as fuel emit no carbon dioxide ($CO_2$) and have excellent energy efficiency, and so are expected to serve as vehicles that can solve $CO_2$ emission problems and energy problems. To put fuel cell vehicles into wide use, hydrogen stations for supplying hydrogen to fuel cell vehicles need vessels (pressure vessels) having excellent strength and durability and capable of safely storing high-pressure hydrogen of 35 MPa or more and in particular about 70 MPa or more, and the development of such vessels is underway.

As in-vehicle pressure vessels that are required to be lightweight, a pressure vessel formed by coating a liner made of a lightweight material such as aluminum or resin with a carbon fiber reinforced plastic (CFRP) has been proposed. For example, JP 2009-024225 A (PTL 1) discloses a liner made of a Al—Mg—Si alloy excellent in fatigue resistance.

On the other hand, pressure vessels used in hydrogen stations need not be reduced in weight like in-vehicle pressure vessels. Accordingly, a pressure vessel entirely formed of a steel material (for example, JP 2010-037655 A (PTL 2)) and a pressure vessel formed by coating a liner made of Cr—Mo steel with carbon fibers or glass fibers (for example, JP 2009-293799 A (PTL 3)) have been proposed.

Low-alloy steel such as Cr—Mo steel is known to be embrittled with hydrogen. In view of this, material for high-pressure hydrogen pressure vessels used at 35 MPa or more is limited to an aluminum alloy or SUS316 which suffers little material degradation by hydrogen.

However, stainless steel such as SUS316 has low strength. Hence, for example in the case of increasing the hydrogen pressure to 70 MPa, the wall thickness of the storage vessel needs to be very thick, leading to an increase in vessel weight. The size of the storage vessel is therefore limited. Thus, not only the amount of hydrogen that can be stored in the vessel decreases, but also excessively high material cost impairs economic efficiency.

Many studies have accordingly been conducted to use, as material for high-pressure hydrogen storage vessels, low-alloy steel of lower material cost instead of austenitic stainless steel. For example, JP 2009-074122 A (PTL 4) proposes a steel for high-pressure hydrogen environment that uses fine V—Mo carbide as a trapping site for hydrogen in steel to make hydrogen non-diffusible, thus suppressing embrittlement by diffusible hydrogen.

JP 2009-046737 A (PTL 5) proposes a low-alloy high-strength steel excellent in high-pressure hydrogen environment embrittlement resistance, with a tensile strength being limited to a very narrow range of 900 MPa to 950 MPa by performing tempering at a relatively high temperature in thermal refining treatment of Cr—Mo steel.

CITATION LIST

Patent Literatures

PTL 1: JP 2009-024225 A
PTL 2: JP 2010-037655 A
PTL 3: P 2009-293799 A
PTL 4: JP 2009-074122 A
PTL 5: JP 2009-046737 A

SUMMARY

Technical Problem

The cooling rate during quenching differs depending on the position in the wall thickness direction, and is lowest in the wall thickness center part. In a thick object such as a composite pressure vessel liner, in particular when the wall thickness is 20 mm or more, the metallic microstructure is substantially different between the surface layer and the inside in the wall thickness direction. With the conventional techniques mentioned above, however, the influence of the metallic microstructure on hydrogen embrittlement is not clarified.

A hydrogen pressure vessel used in a high-pressure hydrogen environment is repeatedly filled with hydrogen, and thus repeatedly stressed. It is therefore desirable to ensure material safety with little material degradation in a fatigue test in a hydrogen environment. With the conventional techniques mentioned above, however, the fatigue limit is not taken into consideration, and there is a possibility that the vessel fractures when used for a long period.

It could therefore be helpful to provide a composite pressure vessel liner that has a tensile strength of 850 MPa or more, has a microstructure with little material degradation in a hydrogen environment, and is suitable for use in a composite pressure vessel for storing high-pressure hydrogen of 70 MPa or more.

Solution to Problem

We conducted detailed research on the entry behavior of high-pressure hydrogen into high-strength steel with a tensile strength of 850 MPa or more and the relationship between the ductility decrease phenomenon of the steel material and the microstructure of the steel material, and discovered the following:

(1) In the case where the wall thickness of the liner is 20 mm or more, the metallic microstructure substantially differs depending on the position in the wall thickness direction, and is martensite microstructure, bainite microstructure, or ferrite and pearlite mixed microstructure depending on the cooling rate.

(2) In each of the metallic microstructures listed in (1), a tensile strength of 850 MPa or more can be obtained by adjusting the heat treatment conditions. In ferrite and pearlite mixed microstructure, however, elongation in a hydrogen environment decreases markedly.

(3) In a fatigue test in a hydrogen environment for test pieces having the same tensile strength, martensite microstructure and bainite microstructure exhibit excellent fatigue limit stress, but ferrite and pearlite mixed microstructure is inferior in fatigue limit stress to martensite microstructure and bainite microstructure.

The present disclosure is based on these discoveries and further studies. We provide the following.

1. A composite pressure vessel liner that is made of a steel material including:

a chemical composition containing (consisting of), in mass %,

C: 0.30% to 0.60%,
Si: 0.01% to 2.0%,
Mn: 0.5% to 3.0%,
P: 0.0005% to 0.060%,
S: 0.0001% to 0.010%,
N: 0.0001% to 0.010%, and
Al: 0.01% to 0.08%, with the balance being Fe and inevitable impurities; and a metallic microstructure in which an area fraction of martensite at a position of ¼ of a wall thickness on an inner side is 30% or more, a total area fraction of martensite and bainite at the position of ¼ of the wall thickness on the inner side is 95% or more, and a total area fraction of martensite and bainite in a wall thickness center part is 95% or more, wherein the composite pressure vessel liner has a wall thickness of 20 mm or more in a longitudinal center part, and a tensile strength of 850 MPa or more in the wall thickness center part.

2. The composite pressure vessel liner according to 1., wherein the chemical composition further contains, in mass %, one or more selected from the group consisting of Mo: 0.005% to 2.0%,
Cr: 0.005% to 3.0%, and
Ni: 0.005% to 3.0%.

3. The composite pressure vessel liner according to 1. or 2., wherein the chemical composition further contains, in mass %, one or more selected from the group consisting of B: 0.0005% to 0.003%,
Cu: 1.0% or less, and
Ca: 0.005% or less.

4. The composite pressure vessel liner according to any one of 1. to 3., wherein the chemical composition satisfies a relationship of the following Expression (1):

$$[Mn]+1.30\times[Cr]+2.67\times[Mo]+0.30\times[Ni]\geq 2.30 \quad (1)$$

where brackets in the Expression (1) indicate a content, in mass %, of an element in the brackets, and indicate 0 in the case where the element is not contained.

5. The composite pressure vessel liner according to any one of 1. to 3., wherein the chemical composition satisfies a relationship of the following Expression (2):

$$[Mn]+1.30\times[Cr]+2.67\times[Mo]+0.30\times[Ni]\geq 3.00 \quad (2)$$

where brackets in the Expression (2) indicate a content, in mass %, of an element in the brackets, and indicate 0 in the case where the element is not contained.

6. A composite pressure vessel comprising:

the composite pressure vessel liner according to any one of 1. to 5.; and a carbon fiber reinforced plastic with which an outer periphery of the composite pressure vessel liner is coated.

7. A method for producing a composite pressure vessel liner, comprising:

quenching in which a steel pipe or tube having the chemical composition according to any one of 1. to 3. or a liner obtained by working the steel pipe or tube into a liner shape is heated to a temperature of $Ac_3$ point or more and 950° C. or less, held at the temperature for 10 min or more, and then cooled under conditions that an average cooling rate from 800° C. to 350° C. in a part slower to cool from among an inner surface and a wall thickness center in a longitudinal center part is 5° C./s or more and an average cooling rate from 800° C. to 350° C. at the inner surface in the longitudinal center part is 30° C./s or more; and tempering in which the steel pipe or tube or the liner after the quenching is reheated to a temperature of 450° C. or more and 750° C. or less and held at the temperature for 10 min or more.

8. A method for producing a composite pressure vessel liner, comprising:

quenching in which a steel pipe or tube having the chemical composition according to 4. or a liner obtained by working the steel pipe or tube into a liner shape is heated to a temperature of $Ac_3$ point or more and 950° C. or less, held at the temperature for 10 min or more, and then cooled under conditions that an average cooling rate from 800° C. to 350° C. in a part slower to cool from among an inner surface and a wall thickness center in a longitudinal center part is 3° C./s or more and an average cooling rate from 800° C. to 350° C. at the inner surface in the longitudinal center part is 20° C./s or more; and tempering in which the steel pipe or tube or the liner after the quenching is reheated to a temperature of 450° C. or more and 750° C. or less and held at the temperature for 10 min or more.

9. A method for producing a composite pressure vessel liner, comprising:

quenching in which a steel pipe or tube having the chemical composition according to 5. or a liner obtained by working the steel pipe or tube into a liner shape is heated to a temperature of $Ac_3$ point or more and 950° C. or less, held at the temperature for 10 min or more, and then cooled under conditions that an average cooling rate from 800° C. to 350° C. in a part slower to cool from among an inner surface and a wall thickness center in a longitudinal center part is 1° C./s or more and an average cooling rate from 800° C. to 350° C. at the inner surface in the longitudinal center part is 10° C./s or more; and tempering in which the steel pipe or tube or the liner after the quenching is reheated to a temperature of 450° C. or more and 750° C. or less and held at the temperature for 10 min or more.

Advantageous Effect

It is thus possible to provide a composite pressure vessel using a composite pressure vessel liner having sufficient strength and a high fatigue limit. The composite pressure vessel liner can bear a larger share of load, with it being possible to reduce the usage of CFRP. Hence, the composite pressure vessel can be provided at lower cost. Such a technique is very useful in industrial terms.

BRIEF DESCRIPTION OF THE DRAWINGS

In the accompanying drawings:

FIG. 1 is a diagram illustrating results of an SSRT test using liners No. 15 and 17.

DETAILED DESCRIPTION

Detailed description is given below. A composite pressure vessel liner according to one of the disclosed embodiments has a wall thickness of 20 mm or more in a longitudinal center part, and is made of a steel material having the metallic microstructure stated above. The reasons for limiting the wall thickness and metallic microstructure of the composite pressure vessel liner are explained below. Herein, "%" regarding metallic microstructure denotes an area fraction unless otherwise noted.

[Wall Thickness]
Wall Thickness in Longitudinal Center Part: 20 mm or More

The longitudinal center part of the liner is a part that is under maximum stress when filling the vessel with hydrogen, and fractures easily. If the wall thickness in the longitudinal center part is less than 20 mm, the liner cannot bear a sufficient share of load, and the amount of CFRP needs to be increased to prevent a fracture. This makes it difficult to reduce the cost of the composite pressure vessel. The wall thickness of the liner in the longitudinal center part is therefore 20 mm or more. The wall thickness in the longitudinal center part is preferably 30 mm or more, and more preferably 36 mm or more. If the wall thickness is excessively thick, the stress of the outside of the liner becomes excessively high during pressure storage. Besides, the additive amount of alloy necessary to obtain the desired microstructure of the liner increases, which requires higher cost. The wall thickness in the longitudinal center part is therefore preferably 80 mm or less, and more preferably 60 mm or less.

[Metallic Microstructure]
Area Fraction of Martensite: 30% or more

In the surface layer of the liner, the cooling rate during heat treatment is higher than that of the inside, and thus the area fraction of martensite can be increased. Since a fatigue crack is most likely to occur from the surface layer on the pressure vessel inner side, it is desirable to enhance the fatigue resistance of the surface layer on the inner side. By increasing the area fraction of martensite, which is excellent in fatigue resistance, in the surface layer on the inner side of the liner, the fatigue resistance can be improved. Hence, the area fraction of martensite at a position of ¼ of the wall thickness on the inner side of the liner is 30% or more. The cooling rate during quenching is lower in a part closer to the wall thickness center. Accordingly, if the area fraction of martensite at the position of ¼ of the wall thickness on the inner side is 30% or more, then the area fraction of martensite in the whole innner surface portion outside the position of ¼ of the wall thickness on the inner side can be regarded as being 30% or more. The area fraction of martensite is preferably 50% or more. No upper limit is placed on the area fraction of martensite, and the area fraction of martensite may be 100% or less.

Total Area Fraction of Martensite and Bainite: 95% or more

If the total area fraction of martensite and bainite in the metallic microstructure of the liner is low, the fatigue limit decreases. Accordingly, in the present disclosure, the total area fraction of martensite and bainite at the position of ¼ of the wall thickness on the inner side of the liner and the total area fraction of martensite and bainite at the wall thickness center are both 95% or more. The cooling rate during quenching is lower in a part closer to the wall thickness center, as mentioned above. Accordingly, if the total area fraction of martensite and bainite at the position of ¼ of the wall thickness on the inner side is 95% or more, then the total area fraction of martensite and bainite in the whole region outside the position of ¼ of the wall thickness on the inner side can be regarded as being 95% or more. No limit is placed on the proportion between martensite and bainite in area fraction, yet the area fraction of martensite is preferably as high as possible in terms of improving the fatigue limit. No upper limit is placed on the total area fraction of martensite and bainite, and the total area fraction of martensite and bainite may be 100% or less.

The area fractions of the microstructures other than martensite and bainite in the metallic microstructure of the liner are preferably as low as possible. As long as the total area fraction of martensite and bainite is 95% or more, however, the influence of the residual microstructures is not significant, and so containing one or more other microstructures such as ferrite, retained austenite, and pearlite at a total area fraction of less than 5% is allowable.

[Chemical Composition]

In the present disclosure, the steel material for the composite pressure vessel liner needs to have a predetermined chemical composition. The reasons for limiting the chemical composition of the steel material are explained below. Herein, "%" regarding components denotes mass % unless otherwise noted.

C: 0.30% to 0.60%

C is an element necessary to increase the strength of the liner. In the present disclosure, the tensile strength of the liner is 850 MPa or more. To obtain such strength, the C content of the liner is 0.30% or more. The C content is preferably 0.33% or more. If the C content is more than 0.60%, quench cracks may occur when performing quenching in the production of liner. The C content is therefore 0.60% or less. The C content is preferably 0.50% or less, and more preferably 0.45% or less.

Si: 0.01% to 2.0%

Si is an element that contributes to improved strength and improved fatigue limit by solid solution strengthening. These effects are achieved if the Si content is 0.01% or more. The Si content is therefore 0.01% or more. The Si content is preferably 0.15% or more. If the Si content is more than 2.0%, the effects are saturated. Besides, the surface characteristics of the steel material degrade, and rollability decreases. The Si content is therefore 2.0% or less. The Si content is preferably 0.5% or less.

Mn: 0.5% to 3.0%

Mn is an element that contributes to improved strength by solid solution strengthening and quench hardenability improvement and has a function of improving the fatigue limit. To achieve these effects, the Mn content is 0.5% or more. The Mn content is preferably 0.6% or more. If the Mn content is more than 3.0%, the effects are saturated, and also rolling in the production is hampered. Besides, if the Mn content is excessively high, austenite remains, causing a decrease in fatigue resistance. The Mn content is therefore 3.0% or less. The Mn content is preferably 2.0% or less, and more preferably 1.5% or less.

P: 0.0005% to 0.060%

P is an inevitable impurity, and is an element that does not much influence the strength of the material but decreases toughness. If the P content is more than 0.060%, toughness decreases significantly. The P content is therefore 0.060% or less. The P content is preferably 0.040% or less, more preferably 0.025% or less, and further preferably 0.015% or less. Excessively reducing P so that the P content is less than 0.0005% increases the production cost in the steelmaking process. The P content is therefore 0.0005% or more.

S: 0.0001% to 0.010%

S is an inevitable impurity, and forms MnS as an inclusion and decreases toughness. These problems do not occur as long as the S content is 0.010% or less. The S content is therefore 0.010% or less. The S content is preferably 0.0030% or less. Excessively reducing S so that the S content is less than 0.0001% increases the desulfurization cost in the steelmaking process. The S content is therefore 0.0001% or more.

The total content of P and S is preferably 0.02% or less, for high-level toughness stabilization.

N: 0.0001% to 0.010%

N has little influence on the fatigue resistance of the steel material, and the advantageous effects according to the present disclosure are not lessened if the N content is 0.010% or less. The N content is therefore 0.010% or less. The N content is preferably 0.004% or less. The N content is desirably low in terms of improving toughness. However, excessively reducing N increases the cost in steelmaking, and so the N content is 0.0001% or more.

Al: 0.01% to 0.08%

Al is an element effective as a deoxidizer in the steelmaking process. To achieve this effect, the Al content is 0.01% or more. The Al content is preferably 0.02% or more. If the Al content is more than 0.08%, ductility decreases due to a decrease in cleanliness. The Al content is therefore 0.08% or less.

The composite pressure vessel liner according to one of the disclosed embodiments is made of a steel material having a chemical composition containing the components described above with the balance being Fe and inevitable impurities. In addition to the above-described elements, the chemical composition may further contain one or more selected from the group consisting of Mo: 0.005% to 2.0%, Cr: 0.005% to 3.0%, and Ni: 0.005% to 3.0%.

Mo: 0.005% to 2.0%

Mo is an element that improves quench hardenability, and contributes to higher strength of the liner. As a result of improving quench hardenability, properties such as fatigue limit and fatigue limit ratio can be improved even in the case where the liner has a wall thickness of 20 mm or more and is likely to have a part with a low cooling rate. Mo also contributes to higher fatigue strength by solid solution strengthening. To achieve these effects, in the case of adding Mo, the Mo content is 0.005% or more. The Mo content is preferably 0.1% or more. If the Mo content is more than 2.0%, the effects are saturated, and higher cost is required. The Mo content is therefore 2.0% or less. The Mo content is preferably 1.0% or less, and more preferably 0.5% or less.

Cr: 0.005% to 3.0%

Cr is an element that improves quench hardenability, and contributes to higher strength of the liner. As a result of improving quench hardenability, properties such as fatigue limit and fatigue limit ratio can be improved even in the case where the liner has a wall thickness of 20 mm or more and is likely to have a part with a low cooling rate. To achieve these effects, in the case of adding Cr, the Cr content is 0.005% or more. The Cr content is preferably 0.5% or more. If the Cr content is more than 3.0%, the effects are saturated, and higher cost is required. The Cr content is therefore 3.0% or less. The Cr content is preferably 2.0% or less, and more preferably 1.5% or less.

Ni: 0.005% to 3.0%

Ni is an element that improves quench hardenability, and contributes to higher strength of the liner. As a result of improving quench hardenability, properties such as fatigue limit and fatigue limit ratio can be improved even in the case where the liner has a wall thickness of 20 mm or more and is likely to have a part with a low cooling rate. To achieve these effects, in the case of adding Ni, the Ni content is 0.005% or more. The Ni content is preferably 0.5% or more. If the Ni content is more than 3.0%, the effects are saturated, and higher cost is required. The Ni content is therefore 3.0% or less. The Ni content is preferably 2.0% or less.

The chemical composition may further contain one or more selected from the group consisting of B: 0.0005% to 0.003%, Cu: 1.0% or less, and Ca: 0.005% or less.

B: 0.0005% to 0.003%

B is an element very useful in enhancing quench hardenability and increasing strength. To achieve this effect, the B content needs to be 0.0005% or more. If the B content is more than 0.003%, the effect is saturated. Accordingly, in the case of adding B, the B content is 0.0005% to 0.003%.

Cu: 1.0% or less

Cu is an element effective in improving toughness and increasing strength. If the Cu content is more than 1.0%, however, surface cracks occur during formation by working. Accordingly, in the case of adding Cu, the Cu content is 1.0% or less. No lower limit is placed on the Cu content, yet the Cu content is preferably 0.05% or more in order to sufficiently achieve the effect.

Ca: 0.005% or less

Ca is an element that controls the morphology of sulfur inclusions and is effective in improving ductility. If the Ca content is more than 0.005%, however, the effect is saturated, and toughness decreases due to a decrease in cleanliness. Accordingly, in the case of adding Ca, the Ca content is 0.005% or less. No lower limit is placed on the Ca content, yet the Ca content is preferably 0.001% or more in order to sufficiently achieve the effect.

The composite pressure vessel liner according to one of the disclosed embodiments can have a chemical composition containing, in mass %, C: 0.30% to 0.60%,
Si: 0.01% to 2.0%,
Mn: 0.5% to 3.0%,
P: 0.0005% to 0.060%,
S: 0.0001% to 0.010%,
N: 0.0001% to 0.010%,
Al: 0.01% to 0.08%, optionally one or more selected from the group consisting of Mo: 0.005% to 2.0%, Cr: 0.005% to 3.0%, and Ni: 0.005% to 3.0%, and optionally one or more selected from the group consisting of B: 0.0005% to 0.003%, Cu: 1.0% or less, and Ca: 0.005% or less, with the balance being Fe and inevitable impurities.

The chemical composition preferably satisfies the relationship of the following Expression (1):

$$[Mn]+1.30\times[Cr]+2.67\times[Mo]+0.30\times[Ni]\geq 2.30 \quad (1)$$

(where the brackets in Expression (1) indicate the content (mass %) of the element in the brackets, and indicate 0 in the case where the element is not contained).

When the chemical composition satisfies the relationship of Expression (1), the quench hardenability of the steel is improved, so that desired properties can be obtained more easily when performing quenching in the production of the liner.

When the chemical composition satisfies the relationship of the following Expression (2), the quench hardenability is further improved, so that desired properties can be obtained very easily when performing quenching in the production of the liner:

$$[Mn]+1.30\times[Cr]+2.67\times[Mo]+0.30\times[Ni]\geq 3.00 \quad (2)$$

(where the brackets in Expression (2) indicate the content (mass %) of the element in the brackets, and indicate 0 in the case where the element is not contained).

Herein, "the case where the element is not contained" with regard to Expressions (1) and (2) includes a case where the element is not substantially contained, for example, a case where the element is contained as an inevitable impurity but its content is below the measurement limit.

[Mechanical Properties]

Tensile Strength in Wall Thickness Center Part: 850 MPa or more

The composite pressure vessel liner according to the present disclosure has a tensile strength (TS) of 850 MPa or more in a wall thickness center part. No upper limit is placed on the tensile strength, yet the tensile strength is preferably 1200 MPa or less and more preferably 1150 MPa or less in terms of ensuring the toughness of the liner.

The composite pressure vessel liner according to the present disclosure preferably has a fatigue limit of 340 MPa or more, and more preferably has a fatigue limit of 400 MPa or more. A higher fatigue limit is more desirable, yet the fatigue limit is typically 600 MPa or less. Since the fatigue limit is 0.4 to 0.5 times the tensile strength, a tensile strength of 850 MPa or more is necessary in order to ensure the above-mentioned fatigue limit. Herein, the fatigue limit is a value in a region from the inner surface of the liner to a depth of ¼ of the wall thickness, and can be measured by the method described in the EXAMPLES section.

In the case of coating the outer periphery of the composite pressure vessel liner with a carbon fiber reinforced plastic (CFRP) to produce a composite pressure vessel, the value of (fatigue limit/tensile strength) which is an index of the relative fatigue strength of the liner is preferably higher, in terms of increasing the share of load on the liner in the composite pressure vessel to reduce the usage of CFRP. Specifically, the value of (fatigue limit/tensile strength) is more preferably 0.45 or more. Since a higher value of (fatigue limit/tensile strength) is more desirable, no upper limit is placed on the value of (fatigue limit/tensile strength), yet the value of (fatigue limit/tensile strength) is typically 0.60 or less. Herein, the fatigue limit used in the calculation of (fatigue limit/tensile strength) is the above-mentioned fatigue limit in the region from the inner surface of the liner to a depth of ¼ of the wall thickness, and the tensile strength used in the calculation of (fatigue limit/tensile strength) is the above-mentioned tensile strength in the wall thickness center part.

[Production Method]

A method for producing a composite pressure vessel liner according to one of the disclosed embodiments is described below.

The composite pressure vessel liner can be produced by performing the following (1) and (2) in order:

(1) quenching; and
(2) tempering.

Each process is described below. The temperatures in the following description each denote the temperature in the wall thickness center part in the longitudinal center part of the steel pipe or tube or the liner unless otherwise noted.

[Quenching]

In the quenching, a steel pipe or tube having the chemical composition described above or a liner obtained by working the steel pipe or tube into a liner shape is heated to a temperature of $Ac_3$ point or more and 950° C. or less, held at the temperature for 10 min or more, and then cooled under the conditions that the average cooling rate from 800° C. to 350° C. in a part slower to cool from among the inner surface and the wall thickness center in the longitudinal center part is 5° C./s or more and the average cooling rate from 800° C. to 350° C. at the inner surface in the longitudinal center part is 30° C./s or more. The steel pipe or tube may be any of a welded steel pipe or tube such as a forge welded steel pipe or tube or an electric-resistance-welded steel pipe or tube, a seamless steel pipe or tube, and so on, but is preferably a seamless steel pipe or tube. The steel pipe or tube may be formed into a liner shape before the quenching or after the quenching and the tempering.

The reasons for limiting the conditions in the quenching are explained below.

Heating Temperature: $Ac_3$ Point or more and 950° C. or less

If the heating temperature in the quenching is less than $Ac_3$ point, ferrite remains in the liner after the quenching, as a result of which the strength and fatigue limit of the liner decrease. The heating temperature is therefore $Ac_3$ point or more. If the heating temperature is more than 950° C., austenite crystal grains coarsen, which may cause a decrease in the shock absorption energy value or toughness of the material after heat treatment. The heating temperature is therefore 950° C. or less.

Holding Time: 10 min or more

If the time (holding time) for holding at the heating temperature is less than 10 min, ferrite remains in the liner after the quenching, as a result of which the strength and fatigue limit of the liner decrease. The holding time is therefore 10 min or more. No upper limit is placed on the holding time, yet the holding time is preferably 600 min or less in terms of production efficiency.

After performing the heating and the holding as described above, the cooling is performed. The cooling method is not limited, and may be any method. To set a high cooling rate, cooling using a liquid as a refrigerant, such as water cooling or oil cooling, is preferable. To reduce the difference in cooling rate in the whole liner and achieve uniform quenching, the steel pipe or tube or the liner is preferably cooled from both the inner side and the outer side.

Average Cooling Rate from 800° C. to 350° C. in a Part Slower to Cool from Among Inner Surface and Wall Thickness Center: 5° C./s or more If the average cooling rate from 800° C. to 350° C. in the cooling is less than 5° C./s, upper bainite, ferrite, and the like form, and the fatigue limit decreases. Accordingly, in the present disclosure, the average cooling rate from 800° C. to 350° C. in a part slower to cool from among the inner surface and the wall thickness center is 5° C./s or more. The average cooling rate is preferably 10° C./s or more. No upper limit is placed on the average cooling rate in terms of material performance. However, if the average cooling rate is more than 100° C./s, a special line is needed and the line cost increases. Hence, the average cooling rate is preferably 100° C./s or less, for line cost reduction.

Average Cooling Rate from 800° C. to 350° C. at Inner Surface: 30° C./s or more

In order to control the metallic microstructure at the position of ¼ of the wall thickness as described above, the cooling rate at the surface needs to be sufficiently high. Various studies revealed that, if the cooling rate at the surface is 30° C./s or more, the metallic microstructure in the whole region at and outside the position of ¼ of the wall thickness satisfies the conditions described above. Hence, in the present disclosure, the cooling rate at the inner surface is 30° C./s or more. No upper limit is placed on the average cooling rate in terms of material performance. However, if the average cooling rate is more than 100° C./s, a special line is needed and the line cost increases. Hence, the average cooling rate is preferably 100° C./s or less, for line cost reduction.

In the case where the chemical composition of the steel satisfies the relationship of Expression (1) as mentioned earlier, the desired microstructure can be obtained if the average cooling rate from 800° C. to 350° C. in a part slower to cool from among the inner surface and the wall thickness center is 3° C./s or more and the average cooling rate from 800° C. to 350° C. at the inner surface is 20° C./s or more. In the case where the chemical composition of the steel satisfies the relationship of Expression (2) as mentioned earlier, the desired microstructure can be obtained if the average cooling rate from 800° C. to 350° C. in a part slower to cool from among the inner surface and the wall thickness center is 1° C./s or more and the average cooling rate from 800° C. to 350° C. at the inner surface is 10° C./s or more.

Herein, the average cooling rate is a value at the longitudinal center of the steel pipe or tube or the liner. The reason for limiting the cooling rate based on the temperature at the longitudinal center is because the longitudinal center part of the liner is usually an origin of fatigue in a high-pressure hydrogen environment. The reason for limiting the cooling rate in a part slower to cool from among the inner surface and the wall thickness center is because the cooling rate at the inner surface is lowest in the case where cooling is performed only from the outer side of the steel pipe or tube or the liner and the cooling rate at the wall thickness center is lowest in the case where cooling is performed from both the inner side and the outer side. By controlling the cooling rate (minimum cooling rate) in a site that is least easy to cool in the above-described manner, the properties of the whole liner can be improved.

[Tempering]

In the subsequent tempering, the steel pipe or tube or the liner after the quenching is reheated to a temperature of 450° C. or more and 750° C. or less and held at the temperature for 10 min or more. The tempering reduces solute carbon and dislocations in martensite, and enables adjustment of necessary properties in a high-pressure hydrogen environment other than the fatigue limit, such as the tensile strength. The reasons for limiting the tempering conditions are explained below.

Reheating Temperature: 450° C. or more and 750° C. or less

If the reheating temperature in the tempering is less than 450° C., the tensile strength becomes excessively high. If the reheating temperature is more than 750° C., ferrite forms. The reheating temperature is therefore 450° C. or more and 750° C. or less. The reheating temperature is preferably 600° C. or more and 700° C. or less.

Holding Time: 10 min or more

If the time (holding time) for holding at the reheating temperature is less than 10 min, solute carbon and dislocations cannot be reduced sufficiently. The holding time is therefore 10 min or more. No upper limit is placed on the holding time, yet the holding time is preferably 600 min or less because, with a holding time of more than 600 min, the effect is saturated and the cost increases.

EXAMPLES

More detailed description is given below, based on examples. The following examples merely represent preferred examples, and the present disclosure is not limited to these examples.

Composite pressure vessel liners made of steel materials having the chemical compositions listed in Table 1 were produced. The production procedure is as follows. First, billets having the chemical compositions listed in Table 1 were produced, and hot-rolled and pipe-or-tube-expanded to yield seamless steel pipes or tubes. The steel pipes or tubes were produced with a pipe or tube expansion finish temperature of 820° C. or more. Each obtained steel pipe or tube was cooled by air, then formed into a liner shape, and further subjected to quenching and tempering. The quenching and tempering conditions are listed in Table 2. The minimum cooling rate in the quenching in Table 2 was measured by a thermocouple placed on the inner surface at the longitudinal center of the liner or embedded in the wall thickness center part at the longitudinal center of the liner. The cooling rate at the wall thickness surface in Table 2 was measured by a thermocouple placed on the inner surface. After the tempering was completed, a decarburized layer formed on the surface was removed to obtain a liner. The metallic microstructure and mechanical properties of each obtained liner were evaluated. The evaluation methods are as follows.

Metallic Microstructure

The metallic microstructure of the obtained liner at each of the position of ¼ of the wall thickness on the inner side and the wall thickness center position was evaluated as follows. Test pieces were collected from the longitudinal center of the liner so that the position of ¼ of the wall thickness on the inner side and the wall thickness center position were each an observation position, and a section of each collected test piece was etched using a 3 vol % nital solution. The section was photographed using a scanning electron microscope (SEM) at appropriate magnifications from 1000 to 5000, and tempered martensite, ferrite, bainite, and pearlite were observed.

In microstructure identification, martensite, ferrite, bainite, and pearlite were visually determined, and the microstructure proportion was measured by image analysis using the SEM photograph and taken to be the area fraction of the corresponding phase. Parts other than these phases were determined as hard, untempered martensite or austenite.

Tensile Strength (TS)

A round bar test piece of 7 mm in diameter was collected from the liner according to JIS Z 2201, and its tensile strength in the wall thickness center part was measured.

Fatigue Limit

The fatigue limit was measured by a fatigue test in a cathodic hydrogen charge environment. A test piece of 7 mm in evaluation portion diameter including the microstructure from the inner surface of the liner to a depth of ¼ of the wall thickness was collected so that the axial direction (length direction) of the test piece was parallel to the surface of the liner. A fatigue test was conducted using the obtained test piece with a stress ratio of −1 under the conditions that approximately the same amount of hydrogen as the amount of hydrogen that enters in high-pressure hydrogen of 115 MPa entered, and the critical stress not resulting in a fracture of the test piece in 1000000 cycles was taken to be the fatigue limit. The cathodic hydrogen charge conditions were set to a current density of 100 $A/m^2$ in a 0.1 N NaOH solution.

SSRT Test in Hydrogen Environment

To evaluate the stability of the liner in a high-pressure hydrogen environment, a slow strain rate tensile delayed fracture (slow strain rate technique, SSRT) test in a cathodic hydrogen charge environment was conducted. The cathodic hydrogen charge conditions were set to a current density of 100 $A/m^2$ in a 0.1 N NaOH solution. While performing cathodic hydrogen charge, the SSRT test was conducted to measure the drawing in the cathodic hydrogen charge environment. The amount of hydrogen entered under the cathodic charge conditions is approximately the same as the amount of hydrogen entered in high-pressure hydrogen of 115 MPa. The strain rate in the measurement was set to $3.3 \times 10^{-3}$/s. For comparison, the same SSRT test was conducted in the air without cathodic hydrogen charge, and the drawing in the air was measured. To obtain sufficient stability in a high-pressure hydrogen environment, the "drawing ratio" defined as "drawing in cathodic hydrogen charge environment/drawing in air" is desirably 0.70 or more. FIG. 1 illustrates stress-strain curves obtained as a result of the SSRT test using liners No. 15 and 17.

TABLE 1

| Steel sample ID | Chemical composition (mass %)*1 | | | | | | | | |
|---|---|---|---|---|---|---|---|---|---|
| | C | Si | Mn | P | S | Al | N | Mo | Cr |
| A1 | 0.30 | 0.10 | 0.54 | 0.0005 | 0.0010 | 0.01 | 0.0001 | — | — |
| A2 | 0.34 | 0.21 | 0.74 | 0.025 | 0.0006 | 0.03 | 0.0003 | — | — |
| A3 | 0.60 | 0.21 | 0.50 | 0.025 | 0.0006 | 0.03 | 0.0100 | — | — |
| A4 | 0.30 | 2.00 | 0.74 | 0.001 | 0.0005 | 0.03 | 0.0003 | — | — |
| A5 | 0.32 | 0.25 | 3.00 | 0.060 | 0.0010 | 0.08 | 0.0001 | — | — |
| B6 | 0.36 | 0.26 | 0.82 | 0.017 | 0.0006 | 0.03 | 0.0090 | 0.88 | — |
| B7 | 0.38 | 0.22 | 0.76 | 0.030 | 0..001 | 0.03 | 0.0003 | — | 1.11 |
| B8 | 0.42 | 0.32 | 0.74 | 0.025 | 0.0006 | 0.03 | 0.0003 | — | — |
| B9 | 0.34 | 0.23 | 0.78 | 0.026 | 0.0054 | 0.03 | 0.0003 | 0.17 | 1.08 |
| B10 | 0.34 | 0.22 | 0.90 | 0.006 | 0.0006 | 0.03 | 0.0050 | 0.88 | — |
| B11 | 0.35 | 0.25 | 0.74 | 0.025 | 0.0006 | 0.03 | 0.0003 | — | 1.16 |
| B12 | 0.45 | 0.23 | 0.74 | 0.025 | 0.0006 | 0.03 | 0.0003 | 0.21 | 0.85 |
| B13 | 0.45 | 0.23 | 0.74 | 0.025 | 0.0006 | 0.03 | 0.0003 | 0.01 | 0.85 |
| B14 | 0.42 | 0.23 | 0.74 | 0.025 | 0.0006 | 0.03 | 0.0003 | 2.00 | 0.85 |
| B15 | 0.42 | 0.23 | 0.74 | 0.025 | 0.0006 | 0.03 | 0.0003 | 0.21 | 0.005 |
| B16 | 0.42 | 0.23 | 0.74 | 0.025 | 0.0006 | 0.03 | 0.0003 | 0.21 | 3.0 |
| C17 | 0.36 | 0.44 | 0.54 | 0.020 | 0.0009 | 0.04 | 0.0060 | 0.17 | 1.08 |
| C18 | 0.36 | 0.44 | 0.54 | 0.020 | 0.0009 | 0.04 | 0.0060 | 0.21 | 1.08 |
| C19 | 0.34 | 0.44 | 0.56 | 0.022 | 0.0006 | 0.04 | 0.0040 | 0.17 | 0.85 |
| C20 | 0.35 | 0.44 | 0.60 | 0.025 | 0.0017 | 0.04 | 0.0020 | 0.21 | 0.85 |
| C21 | 0.35 | 0.44 | 0.60 | 0.025 | 0.0006 | 0.04 | 0.0020 | 0.17 | 0.85 |
| C22 | 0.35 | 0.44 | 0.60 | 0.025 | 0.0017 | 0.04 | 0.0020 | 0.17 | 0.85 |

| Steel sample ID | Chemical composition (mass %)*1 | | | | [Mn] + 1.30[Cr] + 2.67[Mo] + 0.3[Ni] | $Ac_3$*2 (° C.) | Remarks |
|---|---|---|---|---|---|---|---|
| | Ni | B | Cu | Ca | | | |
| A1 | — | — | — | — | 0.54 | 788 | Conforming steel |
| A2 | — | — | — | — | 0.74 | 799 | Conforming steel |
| A3 | — | — | — | — | 0.50 | 768 | Conforming steel |
| A4 | — | — | — | — | 0.74 | 869 | Conforming steel |
| A5 | — | — | — | — | 3.00 | 766 | Conforming steel |
| B6 | — | — | — | — | 3.17 | 817 | Conforming steel |
| B7 | — | — | — | — | 2.20 | 784 | Conforming steel |
| B8 | 0.1 | — | — | — | 0.77 | 790 | Conforming steel |
| B9 | — | — | — | — | 2.63 | 793 | Conforming steel |
| B10 | 0.03 | — | — | — | 3.26 | 809 | Conforming steel |
| B11 | 0.05 | — | — | — | 2.26 | 786 | Conforming steel |
| B12 | 1.77 | — | — | — | 2.94 | 753 | Conforming steel |
| B13 | 3.0 | — | — | — | 2.76 | 728 | Conforming steel |
| B14 | 0.005 | — | — | — | 7.19 | 841 | Conforming steel |
| B15 | 1.77 | — | — | — | 1.84 | 767 | Conforming steel |
| B16 | 1.77 | — | — | — | 5.73 | 734 | Conforming steel |
| C17 | — | 0.001 | — | — | 2.39 | 803 | Conforming steel |
| C18 | — | 0.003 | — | — | 2.50 | 804 | Conforming steel |
| C19 | — | — | 0.09 | — | 2.11 | 808 | Conforming steel |
| C20 | — | — | 1.00 | — | 2.27 | 790 | Conforming steel |
| C21 | — | — | — | 0.002 | 2.15 | 809 | Conforming steel |
| C22 | — | — | — | 0.005 | 2.15 | 809 | Conforming steel |

*1 the balance being Fe and inevitable inpurities
*2 $Ac_3$ (° C.) = 910 − 203[C]$^{1/2}$ − 30[Mn] + 44.7[Si] + 700[P] + 100[Al] + 31.5[Mo] − 11[Cr] − 15.2[Ni] − 20[Cu] + 104[V] where [M] in the expression indicates the content (mass %) of element M.

TABLE 2

| | | | | | | Quenching | | | Tempering | | |
|---|---|---|---|---|---|---|---|---|---|---|---|
| Liner No. | Steel sample ID | Ac₃ point (° C.) | Heating temperature (° C.) | Holding time (min) | Cooling method | Minimum average cooling rate*¹ (° C./s) | Inner surface average cooling rate*² (° C./s) | | Reheating temperature (° C.) | Holding time (min) | Remarks |
| 1 | A1 | 788 | 900 | 30 | Water cooling | 20.0 | 55.2 | | 650 | 60 | Example |
| 2 | A1 | 788 | 900 | 30 | Oil cooling | 0.1 | 15.6 | | 450 | 60 | Comparative Example |
| 3 | A2 | 799 | 900 | 30 | Water cooling | 17.0 | 35.3 | | 640 | 60 | Example |
| 4 | A2 | 799 | 900 | 30 | Air cooling | 0.1 | 8.3 | | 470 | 1440 | Comparative Example |
| 5 | A2 | 799 | 900 | 30 | Water cooling | 3.8 | 35.3 | | 640 | 60 | Comparative Example |
| 6 | A3 | 768 | 900 | 30 | Water cooling | 18.5 | 41.2 | | 660 | 60 | Example |
| 7 | A4 | 869 | 900 | 30 | Water cooling | 16.5 | 38.5 | | 720 | 60 | Example |
| 8 | A5 | 766 | 900 | 30 | Water cooling | 12.5 | 35.5 | | 660 | 60 | Example |
| 9 | B6 | 817 | 900 | 30 | Water cooling | 5.2 | 44.0 | | 650 | 60 | Example |
| 10 | B6 | 817 | 900 | 30 | Oil cooling | 7.3 | 46.3 | | 600 | 60 | Example |
| 11 | B7 | 784 | 900 | 30 | Water cooling | 6.9 | 35.5 | | 650 | 60 | Example |
| 12 | B7 | 784 | 900 | 30 | Air cooling | 0.8 | 12.5 | | 470 | 60 | Comparative Example |
| 13 | B8 | 790 | 900 | 30 | Water cooling | 8.5 | 44.0 | | 650 | 60 | Example |
| 14 | B8 | 790 | 900 | 30 | Air cooling | 1.1 | 16.0 | | 610 | 60 | Comparative Example |
| 15 | B9 | 793 | 900 | 30 | Water cooling | 18.2 | 50.0 | | 665 | 60 | Example |
| 16 | B9 | 793 | 900 | 30 | Oil cooling | 4.7 | 35.0 | | 600 | 60 | Example |
| 17 | B9 | 793 | 900 | 30 | Air cooling | 0.6 | 17.0 | | 450 | 1440 | Comparative Example |
| 18 | B10 | 809 | 900 | 30 | Water cooling | 16.9 | 40.5 | | 660 | 60 | Example |
| 19 | B10 | 809 | 900 | 30 | Oil cooling | 3.3 | 29.9 | | 630 | 60 | Example |
| 20 | B11 | 786 | 900 | 30 | Water cooling | 18.9 | 40.5 | | 630 | 60 | Example |
| 21 | B11 | 786 | 900 | 30 | Oil cooling | 6.8 | 29.9 | | 640 | 60 | Example |
| 22 | B12 | 753 | 900 | 30 | Water cooling | 19.9 | 40.5 | | 640 | 60 | Example |
| 23 | B12 | 753 | 900 | 30 | Oil cooling | 5.0 | 25.6 | | 600 | 60 | Example |
| 24 | B12 | 753 | 900 | 30 | Water cooling | 3.5 | 30.5 | | 640 | 60 | Example |
| 25 | B13 | 728 | 900 | 30 | Water cooling | 18.0 | 40.2 | | 660 | 60 | Example |
| 26 | B14 | 841 | 900 | 30 | Water cooling | 16.5 | 35.0 | | 660 | 60 | Example |
| 27 | B15 | 767 | 900 | 30 | Water cooling | 18.0 | 40.0 | | 660 | 60 | Example |
| 28 | B16 | 734 | 900 | 30 | Water cooling | 22.0 | 45.6 | | 660 | 60 | Example |
| 29 | C17 | 803 | 900 | 30 | Water cooling | 20.2 | 55.0 | | 650 | 60 | Example |
| 30 | C17 | 803 | 900 | 30 | Air cooling | 0.5 | 12.0 | | 475 | 1440 | Comparative Example |
| 31 | C18 | 804 | 900 | 30 | Water cooling | 18.0 | 40.0 | | 660 | 60 | Example |
| 32 | C19 | 808 | 900 | 30 | Water cooling | 18.2 | 48.0 | | 650 | 60 | Example |
| 33 | C19 | 808 | 900 | 30 | Air cooling | 2.1 | 16.3 | | 450 | 1440 | Comparative Example |
| 34 | C20 | 790 | 900 | 30 | Water cooling | 15.5 | 30.5 | | 660 | 60 | Example |
| 35 | C21 | 809 | 900 | 30 | Water cooling | 19.5 | 50.0 | | 665 | 60 | Example |
| 36 | C21 | 809 | 900 | 30 | Air cooling | 1.5 | 12.1 | | 460 | 1440 | Comparative Example |
| 37 | C22 | 809 | 900 | 30 | Water cooling | 12.1 | 32.5 | | 660 | 60 | Example |

*¹average cooling rate from 800 to 350° C. in part slower to cool from among inner surface and wall thickness center in longitudinal center
*²average cooling rate from 800 to 350° C. at inner surface in longitudinal center

TABLE 3

| | | Metallic microstructure | | | | Mechanical properties | | | | |
|---|---|---|---|---|---|---|---|---|---|---|
| | | Position of ¼ of wall thickness on inner side | Wall thickness center part | | | | | | | |
| Liner No. | Wall thickness*¹ (mm) | M area fraction*² (%) | M + B area fraction*² (%) | M + B area fraction*² (%) | Residual microstructure*² | Tensile strength (MPa) | Fatigue limit (MPa) | Fatigue limit/ tensile strength | Drawing ratio in SSRT test*³ | Remarks |
| 1 | 35 | 100 | 100 | 100 | — | 895 | 425 | 0.47 | 0.72 | Example |
| 2 | 22 | 25 | 100 | 100 | F + P | 880 | 380 | 0.43 | 0.53 | Comparative Example |
| 3 | 22 | 80 | 100 | 95 | F + P | 900 | 410 | 0.46 | 0.79 | Example |
| 4 | 45 | 15 | 75 | 60 | F + P | 900 | 360 | 0.40 | 0.55 | Comparative Example |
| 5 | 60 | 20 | 80 | 65 | F + P | 920 | 375 | 0.41 | 0.58 | Comparative Example |
| 6 | 25 | 90 | 10 | 100 | F + P | 1200 | 585 | 0.49 | 0.72 | Example |
| 7 | 25 | 100 | 100 | 100 | — | 1100 | 560 | 0.51 | 0.75 | Example |
| 8 | 25 | 100 | 100 | 100 | — | 900 | 420 | 0.47 | 0.72 | Example |
| 9 | 22 | 100 | 100 | 100 | — | 880 | 460 | 0.52 | 0.81 | Example |
| 10 | 22 | 70 | 100 | 100 | — | 950 | 450 | 0.47 | 0.73 | Example |
| 11 | 22 | 100 | 100 | 100 | — | 880 | 460 | 0.52 | 0.81 | Example |

TABLE 3-continued

| | | Metallic microstructure | | | | | | | | |
|---|---|---|---|---|---|---|---|---|---|---|
| | | Position of ¼ of wall thickness on inner side | Wall thickness center part | | | | | | | |
| | | M | M + B | M + B | | Mechanical properties | | | | |
| Liner No. | Wall thickness*1 (mm) | area fraction*2 (%) | area fraction*2 (%) | area fraction*2 (%) | Residual microstructure*2 | Tensile strength (MPa) | Fatigue limit (MPa) | Fatigue limit/ tensile strength | Drawing ratio in SSRT test*3 | Remarks |
| 12 | 22 | <u>25</u> | 95 | 95 | F + P | 900 | 370 | 0.41 | 0.65 | Comparative Example |
| 13 | 22 | 100 | 100 | 100 | — | 880 | 460 | 0.52 | 0.81 | Example |
| 14 | 22 | <u>15</u> | 95 | 95 | F + P | 920 | 350 | 0.38 | 0.55 | Comparative Example |
| 15 | 22 | 100 | 100 | 100 | — | 887 | 425 | 0.48 | 0.86 | Example |
| 16 | 22 | 30 | 95 | 95 | F + P | 931 | 425 | 0.46 | 0.76 | Example |
| 17 | 22 | <u>20</u> | <u>70</u> | <u>60</u> | F + P | 885 | 375 | 0.42 | 0.60 | Comparative Example |
| 18 | 22 | 90 | 100 | 95 | F + P | 931 | 425 | 0.46 | 0.81 | Example |
| 19 | 22 | 50 | 100 | 95 | F + P | 860 | 425 | 0.49 | 0.72 | Example |
| 20 | 22 | 90 | 100 | 95 | F + P | 900 | 460 | 0.51 | 0.85 | Example |
| 21 | 22 | 40 | 100 | 95 | F + P | 880 | 400 | 0.45 | 0.71 | Example |
| 22 | 22 | 90 | 100 | 95 | F + P | 952 | 450 | 0.47 | 0.81 | Example |
| 23 | 22 | 50 | 100 | 95 | F + P | 885 | 425 | 0.48 | 0.72 | Example |
| 24 | 60 | 70 | 100 | 95 | F + P | 880 | 460 | 0.52 | 0.86 | Example |
| 25 | 25 | 100 | 100 | 100 | — | 885 | 420 | 0.47 | 0.82 | Example |
| 26 | 25 | 90 | 100 | 100 | F + P | 860 | 435 | 0.51 | 0.76 | Example |
| 27 | 25 | 100 | 100 | 100 | — | 930 | 460 | 0.49 | 0.77 | Example |
| 28 | 25 | 100 | 100 | 100 | — | 965 | 450 | 0.47 | 0.80 | Example |
| 29 | 22 | 100 | 100 | 100 | — | 950 | 425 | 0.45 | 0.83 | Example |
| 30 | 22 | <u>10</u> | <u>70</u> | <u>50</u> | F + P | 900 | 375 | 0.42 | 0.55 | Comparative Example |
| 31 | 25 | 100 | 100 | 100 | — | 885 | 400 | 0.45 | 0.71 | Example |
| 32 | 22 | 100 | 100 | 100 | — | 900 | 440 | 0.49 | 0.81 | Example |
| 33 | 22 | 20 | 80 | 60 | F + P | 880 | 350 | 0.40 | 0.60 | Comparative Example |
| 34 | 25 | 100 | 100 | 100 | — | 860 | 400 | 0.47 | 0.75 | Example |
| 35 | 22 | 100 | 100 | 100 | — | 887 | 425 | 0.48 | 0.81 | Example |
| 36 | 22 | <u>15</u> | <u>75</u> | <u>55</u> | F + P | 885 | 350 | 0.40 | 0.58 | Comparative Example |
| 37 | 25 | 100 | 100 | 100 | — | 900 | 480 | 0.53 | 0.71 | Example |

*1 wall thickness of liner in longitudinal center part
*2 M: martensite, B: bainite, F: ferrite, RA: retained austenite, P: pearlite
*3 drawing in cathodic hydrogen charge environment/drawing in air The measurement results are listed in Table 3. The results demonstrate that, even when the chemical composition of the steel material was the same, the mechanical properties of the resultant liner differed significantly in the case where the metallic microstructure was different.

The liners with a metallic microstructure satisfying the conditions according to the present disclosure (Examples) all had sufficient tensile strength, i.e. a tensile strength of 850 MPa or more in the wall thickness center part. The liners of Examples had an excellent fatigue limit of 400 MPa or more, and also an excellent property of 0.45 or more in the value of (fatigue limit/tensile strength) which is an index of relative fatigue strength. The tensile strength in this (fatigue limit/tensile strength) is the tensile strength at a position of ¼ of the wall thickness.

Moreover, as can be understood from the results of the SSRT test, a hydrogen embrittlement phenomenon occurred when the tensile strength was exceeded, and was marked in an elongation region. However, the degree of elongation decrease differed depending on the material, and the liners satisfying the conditions according to the present disclosure did not decrease much in elongation even in a hydrogen environment. Furthermore, as can be understood from Table 3, the liners satisfying the conditions according to the present disclosure did not decrease much in drawing, and all had a drawing ratio of 0.70 or more. On the other hand, the liners of Comparative Examples not satisfying the conditions according to the present disclosure had a drawing ratio of less than 0.70, and were inferior in stability in a hydrogen environment.

As described above, each liner satisfying the conditions according to the present disclosure has a high fatigue limit while also having a high strength of 850 MPa or more in tensile strength, and therefore has excellent durability even when repeatedly stressed due to hydrogen filling. Each liner satisfying the conditions according to the present disclosure also has a high drawing ratio, and accordingly has an excellent hydrogen embrittlement resistance. The composite pressure vessel liner according to the present disclosure thus has excellent properties as a high-pressure hydrogen composite pressure vessel liner.

The invention claimed is:

1. A composite pressure vessel liner that is made of a steel material including:

a chemical composition containing, in mass %,

C: 0.30% to 0.60%,

Si: 0.01% to 2.0%,

Mn: 0.5% to 3.0%,

P: 0.0005% to 0.060%,

S: 0.0001% to 0.010%,

N: 0.0001% to 0.010%,

Al: 0.01% to 0.08%, optionally one or more selected from the group consisting of Mo: 0.005% to 2.0%, Cr: 0.005% to 3.0%, and Ni: 0.005% to 3.0%, and optionally one or more selected from the group consisting of B: 0.0005% to 0.003%, Cu: 1.0% or less, and Ca: 0.005% or less, with the balance being Fe and inevitable impurities; and a metallic microstructure in which an area fraction of martensite at a position of ¼ of a wall thickness on an inner side is 100%, and a total area fraction of martensite and bainite in a wall thickness center part is 95% or more, wherein the composite pressure vessel liner has a tubular shape with a wall thickness of 20 mm or more in a longitudinal center part, a tensile strength of 850 MPa or more in the wall thickness center part, and a fatigue limit of 340 MPa or more in a region from the inner surface of the liner to a depth of ¼ of the wall thickness.

2. The composite pressure vessel liner according to claim 1,
wherein the chemical composition satisfies a relationship of the following Expression (1):

$$[Mn]+1.30\times[Cr]+2.67\times[Mo]+0.30\times[Ni]\geq 2.30 \quad (1)$$

where brackets in the Expression (1) indicate a content, in mass %, of an element in the brackets, and indicate 0 in the case where the element is not contained.

3. The composite pressure vessel liner according to claim 1,
wherein the chemical composition satisfies a relationship of the following Expression (2):

$$[Mn]+1.30\times[Cr]+2.67\times[Mo]+0.30\times[Ni]\geq 3.00 \quad (2)$$

where brackets in the Expression (2) indicate a content, in mass %, of an element in the brackets, and indicate 0 in the case where the element is not contained.

4. A composite pressure vessel comprising:
the composite pressure vessel liner according to claim 1; and
a carbon fiber reinforced plastic with which an outer periphery of the composite pressure vessel liner is coated.

5. A composite pressure vessel comprising:
the composite pressure vessel liner according to claim 2; and
a carbon fiber reinforced plastic with which an outer periphery of the composite pressure vessel liner is coated.

6. A composite pressure vessel comprising:
the composite pressure vessel liner according to claim 3; and
a carbon fiber reinforced plastic with which an outer periphery of the composite pressure vessel liner is coated.

7. A method for producing a composite pressure vessel liner according to claim 1, comprising:
quenching in which a steel pipe or tube having the chemical composition according to claim 1 or a liner obtained by working the steel pipe or tube into a liner shape is heated to a temperature of $Ac_3$ point or more and 950° C. or less, held at the temperature for 10 min or more, and then cooled under conditions that an average cooling rate from 800° C. to 350° C. in a part slower to cool from among an inner surface and a wall thickness center in a longitudinal center part is 5° C./s or more and an average cooling rate from 800° C. to 350° C. at the inner surface in the longitudinal center part is 30° C./s or more; and
tempering in which the steel pipe or tube or the liner after the quenching is reheated to a temperature of 450° C. or more and 750° C. or less and held at the temperature for 10 min or more.

8. A method for producing a composite pressure vessel liner according to claim 2, comprising:
quenching in which a steel pipe or tube having the chemical composition according to claim 2 or a liner obtained by working the steel pipe or tube into a liner shape is heated to a temperature of $Ac_3$ point or more and 950° C. or less, held at the temperature for 10 min or more, and then cooled under conditions that an average cooling rate from 800° C. to 350° C. in a part slower to cool from among an inner surface and a wall thickness center in a longitudinal center part is 3° C./s or more and an average cooling rate from 800° C. to 350° C. at the inner surface in the longitudinal center part is 20° C./s or more; and
tempering in which the steel pipe or tube or the liner after the quenching is reheated to a temperature of 450° C. or more and 750° C. or less and held at the temperature for 10 min or more.

9. A method for producing a composite pressure vessel liner according to claim 3, comprising:
quenching in which a steel pipe or tube having the chemical composition according to claim 3 or a liner obtained by working the steel pipe or tube into a liner shape is heated to a temperature of $Ac_3$ point or more and 950° C. or less, held at the temperature for 10 min or more, and then cooled under conditions that an average cooling rate from 800° C. to 350° C. in a part slower to cool from among an inner surface and a wall thickness center in a longitudinal center part is 1° C./s or more and an average cooling rate from 800° C. to 350° C. at the inner surface in the longitudinal center part is 10° C./s or more; and
tempering in which the steel pipe or tube or the liner after the quenching is reheated to a temperature of 450° C. or more and 750° C. or less and held at the temperature for 10 min or more.

* * * * *